US009531629B2

(12) United States Patent
Hughes et al.

(10) Patent No.: US 9,531,629 B2
(45) Date of Patent: Dec. 27, 2016

(54) FIBRE CHANNEL OVER ETHERNET SWITCH SYSTEM

(71) Applicant: Dell Products L.P., Round Rock, TX (US)

(72) Inventors: Kevin Allen Hughes, Cedar Park, TX (US); Jeffrey S. Kirk, Austin, TX (US); Jason Garth Pearce, Round Rock, TX (US); Joseph White, San Jose, CA (US)

(73) Assignee: Dell Products L.P., Round Rock, TX (US)

( * ) Notice: Subject to any disclaimer, the term of this patent is extended or adjusted under 35 U.S.C. 154(b) by 110 days.

(21) Appl. No.: 14/492,878

(22) Filed: Sep. 22, 2014

(65) Prior Publication Data

US 2016/0087886 A1    Mar. 24, 2016

(51) Int. Cl.
*H04L 12/28* (2006.01)
*H04L 12/56* (2006.01)
*H04L 12/741* (2013.01)
*H04L 12/931* (2013.01)
*H04L 12/46* (2006.01)
*H04L 29/12* (2006.01)

(52) U.S. Cl.
CPC ............ *H04L 45/74* (2013.01); *H04L 12/46* (2013.01); *H04L 12/4625* (2013.01); *H04L 49/351* (2013.01); *H04L 61/106* (2013.01); *H04L 61/6022* (2013.01); *H04L 61/6045* (2013.01)

(58) Field of Classification Search
CPC ...... H04L 45/74; H04L 12/4625; H04L 12/46; H04L 61/106; H04L 49/351; H04L 61/6045; H04L 61/6022

USPC ......................................... 370/392, 401, 466
See application file for complete search history.

(56) References Cited

U.S. PATENT DOCUMENTS

| | | | | |
|---|---|---|---|---|
| 8,369,347 B2* | 2/2013 | Xiong | ............... | H04L 49/357 370/401 |
| 8,811,399 B2* | 8/2014 | Berman | ............... | H04L 12/4625 370/392 |
| 8,976,794 B2* | 3/2015 | Xiong | ............... | H04L 45/745 370/392 |
| 9,178,821 B2* | 11/2015 | Berman | ............... | H04L 12/4625 |
| 2006/0251067 A1* | 11/2006 | DeSanti | ............ | H04L 29/12801 370/389 |
| 2011/0051733 A1* | 3/2011 | Hirata | ................. | H04L 49/10 370/400 |

(Continued)

*Primary Examiner* — Chuong T Ho
(74) *Attorney, Agent, or Firm* — Haynes and Boone, LLP

(57) ABSTRACT

An FCoE switch system includes a switch IHS that is directly connected to a first endpoint IHS through a first edge port and to a second endpoint IHS through a second edge port. The switch IHS is receives an FCoE communication through the first edge port from the first endpoint IHS that includes an FC header, a source MAC address, and a destination MAC address. The switch IHS then creates a derived MAC address using information included in the FC header, and replaces the destination MAC address in the FCoE communication with the derived MAC address. In response to determining that the second endpoint is directly connected to the second edge port, the switch IHS replaces the source MAC address in the FCoE communication with a local FCF-MAC address. The switch IHS then forwards the first FCoE communication to the second endpoint IHS through the second edge port.

18 Claims, 4 Drawing Sheets

(56) References Cited

U.S. PATENT DOCUMENTS

| | | | |
|---|---|---|---|
| 2011/0064086 A1* | 3/2011 | Xiong | H04L 49/351 370/401 |
| 2012/0063316 A1* | 3/2012 | Ghanwani | H04L 47/10 370/235 |
| 2013/0028135 A1* | 1/2013 | Berman | H04L 12/4625 370/254 |
| 2013/0148663 A1* | 6/2013 | Xiong | H04L 45/745 370/392 |
| 2014/0092908 A1* | 4/2014 | Berman | H04L 45/02 370/392 |
| 2014/0119371 A1* | 5/2014 | Desai | H04L 49/351 370/392 |
| 2014/0192812 A1* | 7/2014 | Berman | H04L 12/4625 370/392 |
| 2015/0071287 A1* | 3/2015 | Berman | H04L 12/4625 370/392 |
| 2016/0036702 A1* | 2/2016 | Yang | H04L 45/58 370/392 |

* cited by examiner

FIBRE CHANNEL OVER ETHERNET SWITCH SYSTEM

BACKGROUND

The present disclosure relates generally to information handling systems, and more particularly to a Fibre Channel over Ethernet switch system for information handling systems.

As the value and use of information continues to increase, individuals and businesses seek additional ways to process and store information. One option is an information handling system (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

Some IHSs transmit data using Fibre Channel (FC) communications over non-FC technologies or systems. For example, the Fibre Channel Backbone-5 (FC-BB-5) standard, published by the International Committee for Information Technology Standards, defines the functions and mappings for transporting FC over different (i.e., non-FC) network technologies such as, for example, FC over Transport Control Protocol/Internet Protocol (TCP/IP), FC over Transparent Generic Framing Procedure (GFPT), FC over Multiprotocol Label Switching (MPLS), and FC over Fibre Channel over Ethernet (FCoE). The FC-BB-5 standard introduces inefficiencies during normal operation in some scenarios.

For example, during normal FCoE operations according to the FC-BB-5 standard, FCoE data traffic is forwarded/routed through an Fiber Channel Forwarder (FCF) on a converged switch IHS even if the source and destination IHSs are directly reachable across a local layer-2 (L2) Ethernet network (e.g., via a virtual local area network (VLAN) or L2 domain). In order to achieve the FCoE encapsulation of the FC frame sent by a source IHS to a destination IHS, the media access control (MAC) address of the FCF with which the source IHS completed its fabric login (i.e., the FCF-MAC address) is used as the destination MAC (DMAC) address of the FCoE frame. The Fabric-Provided MAC address (FPMA) of the virtual N_Port (VN_Port) within the source IHS is used as the source MAC (SMAC) address of the FCoE frame. Upon receiving the FCoE frame from the source IHS, the FCF performs a forward lookup using the destination identifier (D_ID) in the FCoE frame, replaces the DMAC address in the FCoE frame (i.e., the FCF-MAC address) with the MAC address of the VN_Port within the destination IHS, and replaces the SMAC address in the FCoE frame with its own FCF-MAC address. These actions result from the requirement in the FC-BB-5 standard that IHSs connecting to the FCF across the L2 network use a virtual wire model so that the VN_Port looks like it is directly attached at the FC layer to the FCF's FC switching function. However, when the source IHS and destination IHS are directly reachable across a local L2 Ethernet network, this FCF forwarding requirement has the consequence of adding one or more L2 Ethernet hops, as well as an FCF FC_ID lookup hop, to the data transmission path.

Accordingly, it would be desirable to provide an improved FCoE switch system.

SUMMARY

A Fibre Channel over Ethernet (FCoE) switch system, includes a processing system; a memory system that includes instructions that, when executed by the processing system, cause the processing system to provide an address replacement engine that is configured to: receive a first FCoE communication from a first endpoint device through a first edge port, wherein the first FCoE communication includes an Fibre Channel (FC) header and a destination media access control (MAC) address; create a derived MAC address using information included in the FC header; replace the destination MAC address in the first FCoE communication with the derived MAC address; and forward the first FCoE communication to a second endpoint device.

DETAILED DESCRIPTION

For purposes of this disclosure, an IHS may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an IHS may be a personal computer, a PDA, a consumer electronic device, a display device or monitor, a network server or storage device, a switch router or other network communication device, or any other suitable device and may vary in size, shape, performance, functionality, and price. The IHS may include memory, one or more processing resources such as a central processing unit (CPU) or hardware or software control logic. Additional components of the IHS may include one or more storage devices, one or more communications ports for communicating with external devices as well as various input and output (I/O) devices, such as a keyboard, a mouse, and a video display. The IHS may also include one or more buses operable to transmit communications between the various hardware components.

Figure 1:
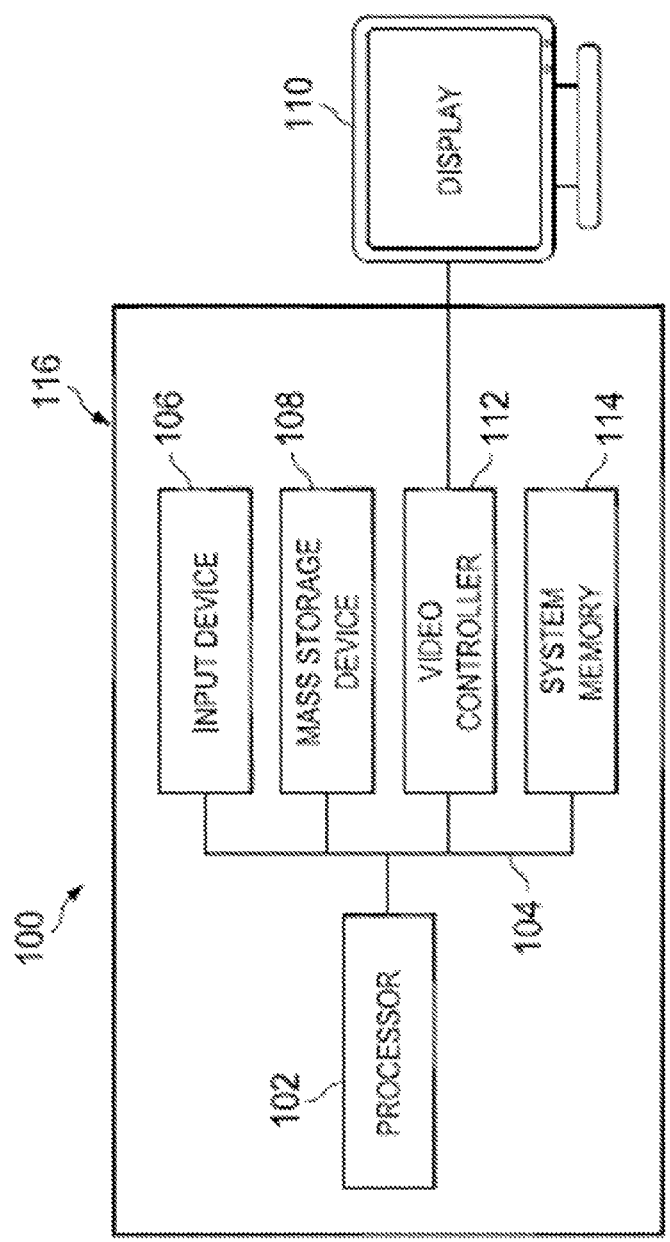
FIG. 1 is a schematic view illustrating an embodiment of an information handling system.

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
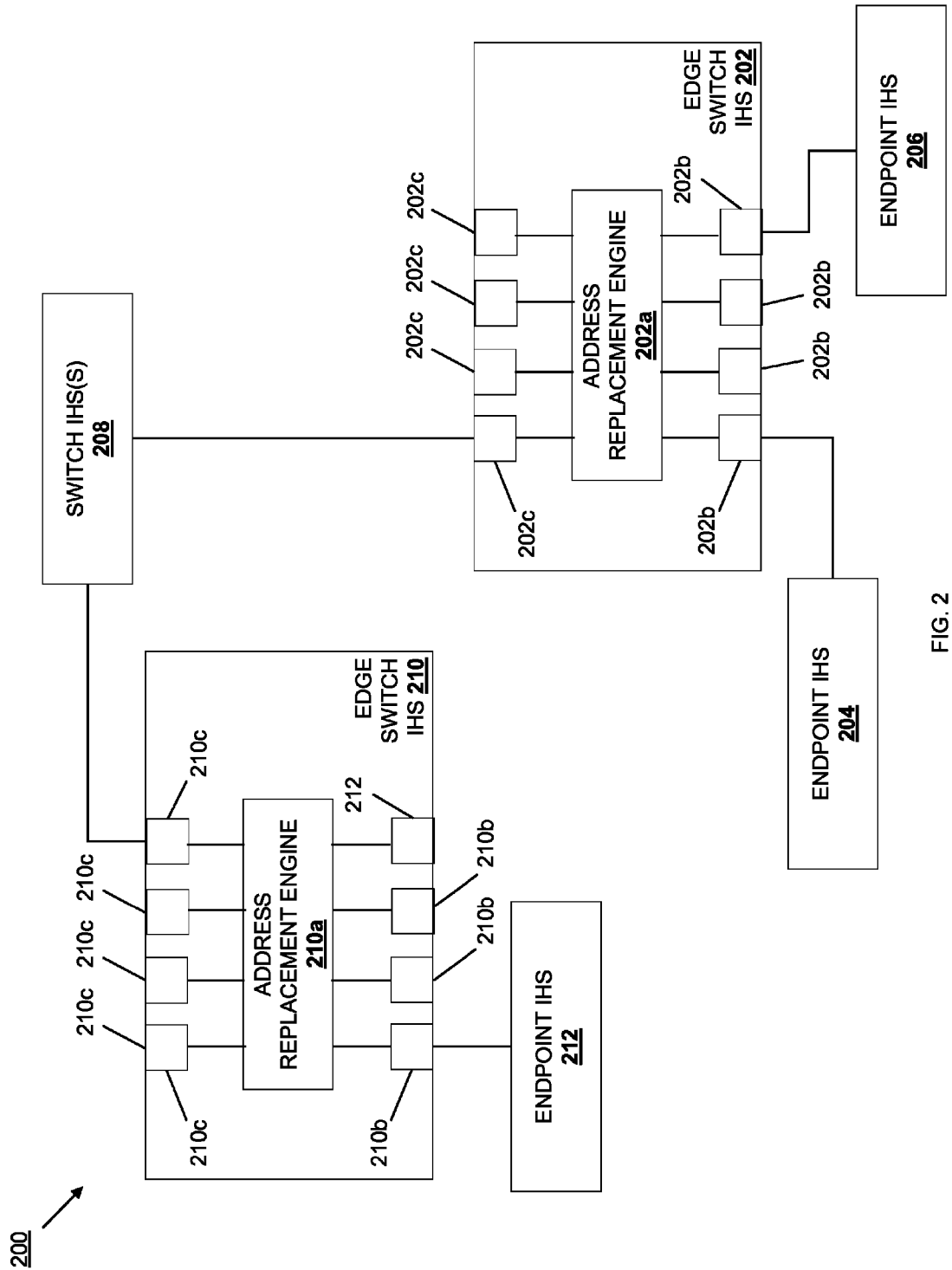
FIG. 2 is a schematic view illustrating an embodiment of an FCoE switch system.

Referring now to FIG. 2, an embodiment of a Fibre Channel over Ethernet (FCoE) switch system 200 is illustrated. The FCoE switch system 200 includes an edge switch IHS 202, which may be the IHS 100 discussed above with reference to FIG. 1, and/or which may include some or all of the components of the IHS 100. The edge switch IHS 202 includes an address replacement engine 202a that may be provided by a processing system (which may include a central processing unit (CPU), an Ethernet switch chip, a PHY chip, combinations thereof, and/or other processing systems known in the art), and a memory system. For example, the memory system may include instructions that, when executed by the processing system, cause the processing system to perform the functions of the address replacement engine 202a discussed below. The edge switch IHS 202 includes a plurality of ports 202b. A plurality of endpoint IHSs 204 and 206, which may each be the IHS 100 discussed above with reference to FIG. 1 and/or which may include some or all of the components of the IHS 100, are coupled to respective ports 202b. In some embodiments, discussed below, the endpoint IHS 204 may be a source endpoint IHS or FC-BB-5 initiator device. In some embodiments, discussed below, the endpoint IHS 206 may be a destination endpoint IHS or FC-BB-5 target device. The edge switch IHS 202 also includes a plurality of ports 202c. One or more conventional switch IHSs 208 are coupled to respective ports 202c, and each of those conventional switch IHSs may be the IHS 100 discussed above with reference to FIG. 1 and/or may include some or all of the components of the IHS 100.

The FCoE switch system 200 also includes an edge switch IHS 210 that is substantially similar to the edge switch IHS 202 and that may be the IHS 100 discussed above with reference to FIG. 1 and/or may include some or all of the components of the IHS 100. The edge switch IHS 210 includes an address replacement engine 210a that may be provided by a processing system (which may include a central processing unit (CPU), an Ethernet switch chip, a PHY chip, combinations thereof, and/or other processing systems known in the art), and a memory system. For example, the memory system may include instructions that, when executed by the processing system, cause the processing system to perform the functions of the address replacement engine 210a discussed below. The edge switch IHS 202 includes a plurality of ports 210b. An endpoint IHS 212 that may be the IHS 100 discussed above with reference to FIG. 1 and/or that may include some or all of the components of the IHS 100, is coupled to one of the ports 210b. In some embodiments, discussed below, the endpoint IHS 212 may be a destination endpoint IHS or FC-BB-5 target device. The edge switch IHS 210 also includes a plurality of ports 210c. The one or more conventional switch IHSs 208 are coupled to respective ports 210c. While the one or more conventional switch IHSs 208 are discussed below as being switch-type networking devices, they may include any type of IHSs (e.g., servers) that are reachable via an L2 MAC address and that provide general FCoE fabric services.

As discussed above, conventional FCoE switch systems operating according to the FC-BB-5 standard can produce inefficiencies, including adding one or more L2 Ethernet hops, as well as an FCF FC_ID lookup hop, to the data transmission path when transmitting data between a source IHS and a destination IHS that are directly reachable across a local L2 Ethernet network (e.g., a data transmission between the endpoint IHS 204 and the endpoint IHS 206 coupled to the edge switch IHS 202). Eliminating these inefficiencies is desirable for both latency improvement and congestion reduction. As discussed in detail below, FC stack centralization or software defined storage networking can be used to simplify storage area network (SAN) configuration and operation by connecting the FC and FCoE endpoints transparently and without the need for configuration or knowledge of the centralized FC services. For example, the MAC address replacement at the edge switch IHSs of an FCoE switch system, as described herein, provides for transparent centralization of forwarding decisions and MAC address learning of local L2 network components.

Figure 3:
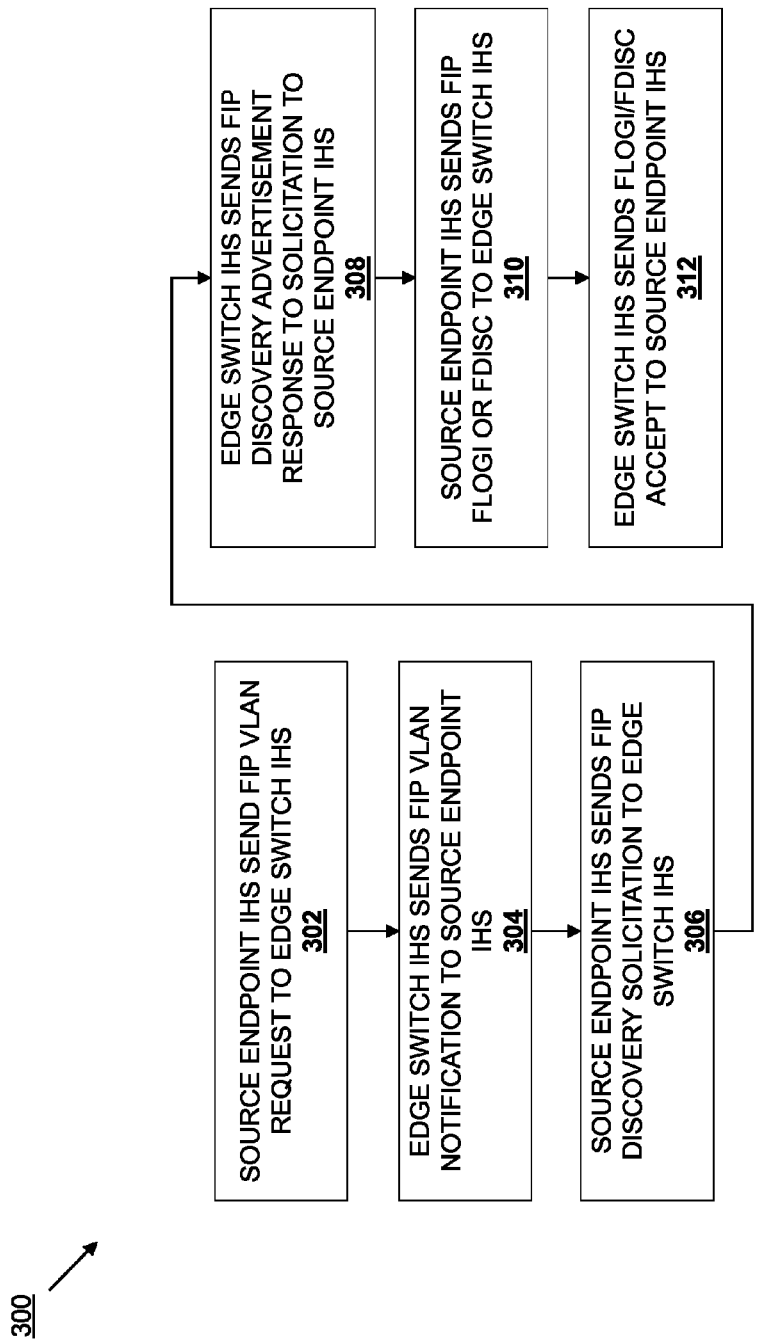
FIG. 3 is a flow chart illustrating an embodiment of a portion of a method for providing FCoE communications in the FCoE switch system of FIG. 2.
Figure 4:
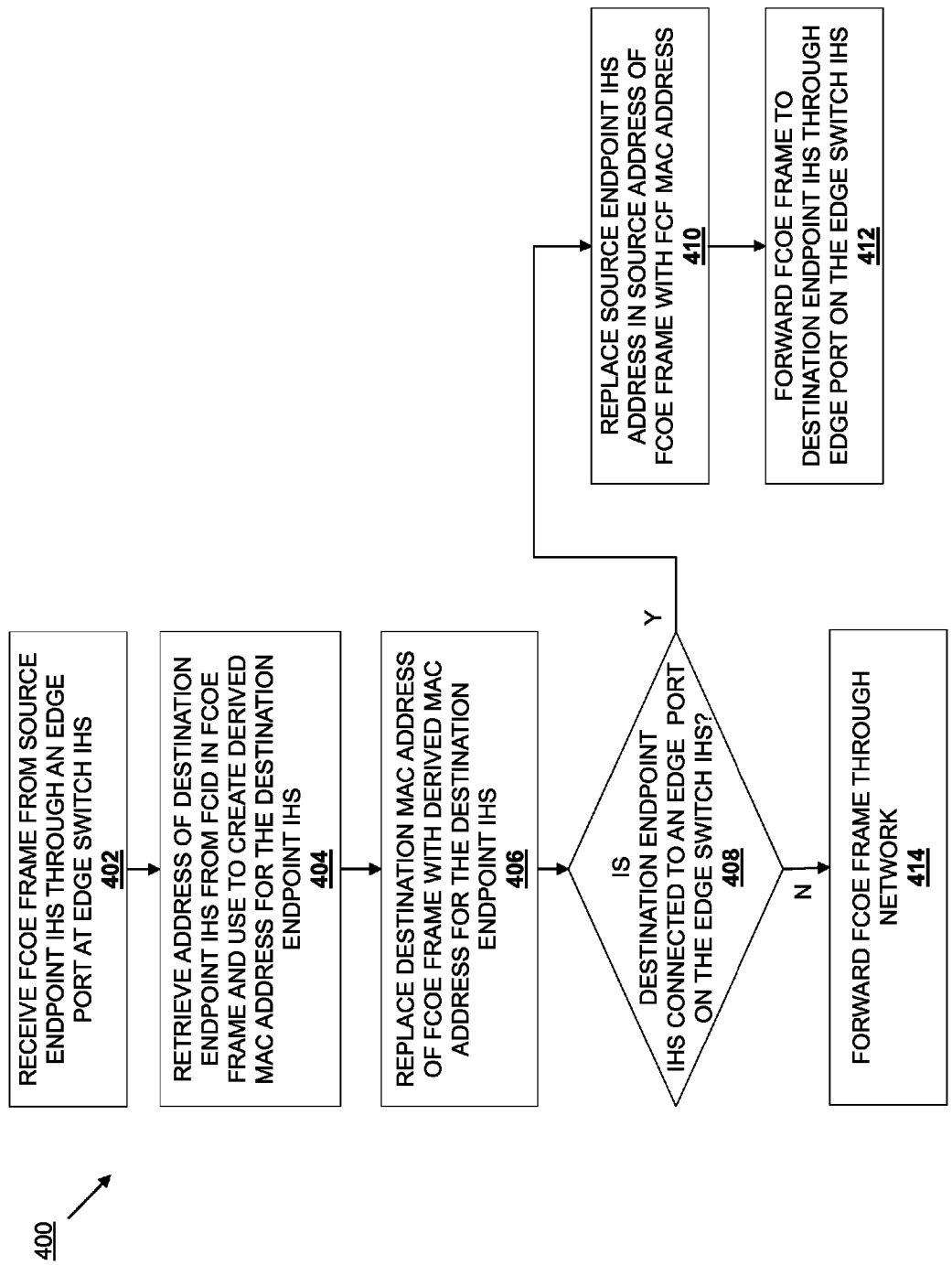
FIG. 4 is a flow chart illustrating an embodiment of a portion of a method for providing FCoE communications in the FCoE switch system of FIG. 2.

Referring now to FIGS. 3 and 4, methods 300 and 400 for providing FCoE communications are illustrated. In the examples provided below, the method 300 provides for the establishment of a control plane for FCoE communications between the endpoint IHS 204 and the edge switch IHS 202, while the method 400 utilizes the established control plane provided via the method 300 to transmit FCoE communications from the (source) endpoint IHS 204 to either of the (destination) endpoint IHS 206 (connected directly to the same edge switch IHS 202 as the (source) endpoint IHS 204) and/or the (destination) endpoint IHS 212 (connected to the edge switch IHS 202 through the one or more conventional switch IHS(s) 208 through an edge switch IHS 210). In the methods 300 and 400, the operation of the edge switch IHS 202 is primarily discussed, but one of skill in the art in possession of the present disclosure will recognize that the edge switch IHS 210 may operate in substantially the same manner. Furthermore, one of skill in the art will recognize that the discussion below assumes that the endpoint IHSs 204, 206 and/or 212 are in a common zone such that they are allowed to communicate.

Referring first to FIGS. 2 and 3, an embodiment of the method 300 is described. The method 300 is discussed below as being performed by the endpoint IHS 204 (a source endpoint IHS or FC-BB-5 initiator device in the embodiments discussed below). However, other source endpoint IHSs, destination endpoint IHSs, FC-BB-5 initiator devices, and/or FC-BB-5 target devices in the FC switch system 200 may perform the method 300 to establish the control plane as described herein. One of skill in the art in possession of the present disclosure will recognize that the FCoE frames exchanged during the establishment of the control plane during the method 300 may also be forwarded to an FCF or other general FC fabric service provided by the conventional switch IHS(s) 208, but such communications are not described herein for clarity. The method 300 begins at block 302 where a source endpoint IHS sends an FCoE initiation Protocol (FIP) VLAN request to an edge switch IHS. In an embodiment, the endpoint IHS 204 (which in this embodiment is a source endpoint IHS or FC-BB-5 initiator device) sends a FIP VLAN request through the port 202b to the address replacement engine 202a in the edge switch IHS 202a. In an embodiment, the endpoint IHS 204 may include a converged network adapter (CNA) that operates to perform the communications of the endpoint IHS 204. In an example, the FIP VLAN request sent by the endpoint IHS 204 at block 302 may include a DMAC address that includes an "all-FCF-MAC" address (e.g., 01:10:18:01:00:02) that is redirected to the processing system in the edge switch IHS 202 based on an FIP ethertype, and an SMAC address that includes a MAC address of the endpoint IHS 204 (e.g., 01:02:03:04:05:06).

The method 300 then proceeds to block 304 where the edge switch IHS sends an FIP VLAN notification to the source endpoint IHS. In an embodiment, in response to receiving the FIP VLAN request at block 302, the address replacement engine 202a in the edge switch IHS 202 sends an FIP VLAN notification through the port 202b to the endpoint IHS 204. The address replacement engine 202a may send the FIP VLAN notification in response to the FIP VLAN request according to FIP standards that are known in the art. In an example, the FIP VLAN notification sent by the address replacement engine 202a at block 304 may include a DMAC address that includes the MAC address of the endpoint IHS 204 (e.g., 01:02:03:04:05:06), and an SMAC address that includes an FCF-MAC address used by the address replacement engine 202a (e.g., F0:4D:A2:00:DE:XX).

The method 300 then proceeds to block 306 where the source endpoint IHS sends an FIP Discovery Solicitation to the edge switch IHS. In an embodiment, the endpoint IHS 204 sends an FIP Discovery Solicitation through the port 202b to the address replacement engine 202a in the edge switch IHS 202a. In an example, the FIP Discovery Solicitation sent by the source endpoint IHS 204 at block 302 may include a DMAC address that either includes the "all-FCF-MAC" address (e.g., 01:10:18:01:00:02) that is redirected to the processing system in the edge switch IHS 202 based on an FIP ethertype or the FCF MAC address received in the VLAN notification, and an SMAC address that includes the MAC address of the endpoint IHS 204 (e.g., 01:02:03:04:05:06).

The method 300 then proceeds to block 308 where the edge switch IHS sends an FIP Discovery Advertisement: Response to Solicitation to the source endpoint IHS. In an embodiment, in response to receiving the FIP Discovery Solicitation at block 306, the address replacement engine 202a in the edge switch IHS 202 sends an FIP Discovery Advertisement: Response to Solicitation through the port 202b to the endpoint IHS 204. The address replacement engine 202a may send the FIP Discovery Advertisement: Response to Solicitation in response to the FIP Discovery Solicitation according to FIP standards that are known in the art. In an example, the FIP Discovery Advertisement: Response to Solicitation sent by the address replacement engine 202a at block 308 may include a DMAC address that includes the MAC address of the endpoint IHS 204 (e.g., 01:02:03:04:05:06), and an SMAC address that includes the FCF-MAC address used by the address replacement engine 202a (e.g., F0:4D:A2:00:DE:XX).

The method 300 then proceeds to block 310 where the source endpoint IHS sends an FIP Fabric Login (FLOGI) or Fabric Discovery (FDISC) to an edge switch IHS. In an embodiment, the endpoint IHS 204 sends an FIP FLOGI or FDISC through the port 202b to the address replacement engine 202a in the edge switch IHS 202a. For example, the endpoint IHS 204 may send a FIP FLOGI if the endpoint IHS 204 includes the first virtual port to log in on the physical port 202b of the edge switch IHS 202. Subsequent endpoint IHSs that log in virtual ports to the physical port 202b on the edge switch IHS 202 will send FDISC per N_Port ID Virtualization (NPIV) standards. In an example, the FIP FLOGI or FDISC sent by the source endpoint IHS 204 at block 310 may include a DMAC address that includes the "all-FCF-MAC" address (e.g., 01:10:18:01:00:02) that is redirected to the processing system in the edge switch IHS 202 based on an FIP ethertype, and an SMAC address that includes the MAC address of the endpoint IHS 204 (e.g., 01:02:03:04:05:06).

The method 300 then proceeds to block 312 where the edge switch IHS sends a FLOGI/FDISC Accept to the source endpoint IHS. In an embodiment, in response to receiving the FIP FLOGI or FDISC at block 310, the address replacement engine 202a in the edge switch IHS 202 sends an FLOGI/FDISC Accept through the port 202b to the endpoint IHS 204. The address replacement engine 202a may send the FLOGI/FDISC Accept in response to the FLOGI or FDISC according to FC Link Service (FC-LS) standards that are known in the art. In an example, the FLOGI/FDISC Accept sent by the address replacement engine 202a at block 312 may include a DMAC address that includes the VN_Port MAC address/FPMA of the endpoint IHS 204 (e.g., 0E:FC:00:01:02:03) that is provided by the address replacement engine 202a in the edge switch IHS 202, an SMAC address that includes the FCF-MAC address used by the address replacement engine 202a (e.g., F0:4D:A2:00:DE:XX), a D_ID of the endpoint IHS 204 (e.g., 01:02:03), and a S_ID (e.g., FF:FF:FE). In an embodiment, the address replacement engine 202a provides the VN_Port MAC address/FPMA of the endpoint IHS 204 by retrieving the D_ID of the FC header in the FLOGI/FDISC and concatenating it with the FC-MAP, and then providing the result as the DMAC address in the FLOGI/FDISC Accept. In an embodiment, the D_ID is assigned and sent to the address replacement engine 202a by the fabric login server, and the S_ID is an FC Well Known Address (WKA).

Following the sending of the FLOGI/FDISC Accept by the edge switch IHS 202, the address replacement engine 202a has the information needed to set up an address replacement algorithm in the processing system or other hardware of the edge switch IHS 202. In an embodiment, the address replacement engine 202a includes code that provides that any further FCoE data transmissions, communications, or other conversations that are not directed to a FIP or an FCoE WKA are to be modified so that they are sent directly to the VN_Port associated with the destination endpoint IHS identified in FCoE frames, which as discussed below is accomplished by looking into an FC header of the FCoE frames, replacing the destination FCF-MAC address in a transmitted FCoE frame with a derived MAC address made up of the 3 byte FC-MAP prepended to the D_ID in an FC header field, and replacing the SMAC address in received FCoE frames with the FCF-MAC address that the destination endpoint IHS expects to be communicating with. One of skill in the art in possession of the present disclosure will recognize that following the method 300 there may be further FCoE formatted FC WKA traffic between the endpoint IHS 204 and the edge switch IHS 202. However, such data traffic is known in the art and is not described here further for sake of clarity. Furthermore, other WKA traffic between the endpoint IHS 204 and the edge switch IHS 202 may be transmitted following the method 300 such that other IHSs that are in a common zone with the endpoint IHS 204 are discovered (e.g., utilizing a name server).

Referring now to FIGS. 2 and 4, the method 400 begins at block 400 where an FCoE frame from a source endpoint IHS is received through an edge port at the edge switch IHS. In an embodiment, the address replacement engine 202*a* receives an FCoE frame sent by the endpoint IHS 204 through the port 202*b*. In an embodiment, the FCoE frame includes an FCoE Port Login (PLOGI) frame with a DMAC address that includes the FCF-MAC address used by the address replacement engine 202*a* (e.g., F0:4D:A2:00:DE:XX), an SMAC address that includes a VN_Port MAC/FPMA of the endpoint IHS 204 that was provided by the address replacement engine 202*a* in the edge switch IHS 202 (e.g., 0E:FC:00:01:02:03), a D_ID of the destination endpoint IHS (e.g., 01:02:04), and a S_ID of the endpoint IHS 204 (e.g., 01:02:03). It is noted that, in conventional FCoE switch systems operating according to the FC-BB-5 standard, the FCF-MAC address received during FIP is always used as the DMAC address of FCoE frames sent from an endpoint IHS. As discussed below, the FCoE switching system 200 of the present disclosure operates to receive conventional FCF-MAC address traffic according to the FC-BB-5 standard and modify the DMAC address in the FCoE frame in order to provide direct endpoint IHS communication (when those endpoint IHSs are connected to the same edge switch IHS) without the need to modify the code in the endpoint IHSs.

The method 400 then proceeds to block 404 where the address of the destination endpoint IHS is retrieved from the FC_ID in the FCoE frame and used to create a FPMA/derived MAC address for the destination endpoint IHS. In an embodiment, the address replacement engine 202*a* in the edge switch IHS 202 creates a FPMA/derived MAC address for the destination endpoint IHS by prepending a 3 byte FC-MAP (e.g., 0E:FC:00) to the D_ID in the FC header field (e.g., (01:02:04). As such, the derived MAC address for the destination endpoint IHS in this example would be 0E:FC:00:01:02:04.

The method 400 then proceeds to block 406 where the address of the destination endpoint IHS in the FCoE frame is replaced with the derived MAC address for the destination endpoint IHS. In an embodiment, the address replacement engine 202*a* in the edge switch IHS 202 replaces the FCF-MAC address used as the DMAC address (e.g., as is used by a conventional switch IHS operating according to the FC-BB-5 standard) in the FCoE PLOGI with the derived MAC address created in block 404 such that the FCoE frame includes a DMAC address with the derived MAC address (e.g., 0E:FC:00:01:02:04), an SMAC address that includes the VN_Port MAC/FPMA of the endpoint IHS 204 that was provided by the address replacement engine 202*a* in the edge switch IHS 202 (e.g., 0E:FC:00:01:02:03), a D_ID of the destination endpoint IHS (e.g., 01:02:04), and a S_ID of the endpoint IHS 204 (e.g., 01:02:03).

The method 400 then proceeds to decision block 408 where it is determined whether the destination endpoint IHS is connected to an edge port on the edge switch IHS. In an embodiment, the address replacement engine 202*a* determines whether the FCoE frame sent by the endpoint IHS 204 is directed to a destination endpoint IHS that is coupled to an edge port (e.g., the endpoint IHS 206 coupled to one of the ports 202*b* on the edge switch IHS 202) or not (e.g., the endpoint IHS 212). For example, the address replacement engine may retrieve the DMAC address or the D_ID in the FCoE frame and compare it to forwarding tables in a database of the edge switch IHS 202 in order to determine whether the destination endpoint IHS for the FCoE frame is connected to one of the ports 202*b* on the edge switch IHS 202.

If at decision block 408 it is determined that the destination endpoint IHS is connected to an edge port on the edge switch IHS (i.e., the FCoE frame is directed to the destination endpoint IHS 206 connected to one of the ports 202*b* on the edge switch IHS 202), the method 400 proceeds to block 410 where the address of the endpoint IHS 204 in the SMAC address of the FCoE frame is replaced with the FCF-MAC address. In an embodiment, the address replacement engine 202*a* in the edge switch IHS 202 replaces the VN_Port MAC/FPMA of the endpoint IHS 204 in the FCoE frame with the local FCF-MAC address (i.e., the FCF-MAC address in the edge switch IHS 202). Thus, following block 410, the FCoE frame includes a DMAC address that includes derived MAC address (e.g., 0E:FC:00:01:02:04), an SMAC address that includes the FCF-MAC address of the edge switch IHS 202 (e.g., F0:4D:A2:00:DE:XX), the D_ID of the endpoint IHS 206 (e.g., 01:02:04), and the S_ID of the endpoint IHS 204 (e.g., 01:02:03).

The method 400 then proceeds to block 412 where the FCoE frame is forwarded to the destination endpoint IHS through the edge port on the edge switch IHS. In an embodiment, the address replacement engine 202*a* in the edge switch IHS 202 forwards the FCoE frame through the port 202*b* to the endpoint IHS 206. One of skill in the art in possession of the present disclosure will recognize that the replacement of the SMAC address of the source endpoint IHS in the FCoE frame with the FCF-MAC address at block 410 makes the FCoE frame compliant with the FC-BB-5 standard, which allows for direct source-IHS-to-destination-IHS traffic, as the destination endpoint IHS will think that the FCoE frame is coming from an FCF it expects to be communicating with (when it is actually coming from the VN_Port associated with the source endpoint IHS.)

Furthermore, a reply communication by the endpoint IHS 206 (which would turn endpoint IHS 206 into a source endpoint IHS or FC-BB-5 initiator device) to the endpoint IHS 204 (which would turn endpoint IHS 204 into a destination endpoint IHS or FC-BB-5 target device) may be treated by the address replacement engine 202*a* similarly as discussed above with reference to blocks 404 and 406. Furthermore, all further communications between the endpoint IHS 204 and 206 may be treated similarly as well. For example, an FCoE frame received by the address replacement engine 202*a* from the endpoint IHS 206 through the port 202*b* may have its DMAC address replaced with a derived MAC address for the endpoint IHS 204 such that the FCoE frame includes a DMAC address that includes the derived MAC address (e.g., 0E:FC:00:01:02:03), an SMAC address that includes a VN_Port MAC/FPMA of the endpoint IHS 206 that was provided by the address replacement engine 202*a* in the edge switch IHS 202 (e.g., 0E:FC:00:01:02:04), a D_ID of the endpoint IHS 204 (e.g., 01:02:03), and a S_ID of the endpoint IHS 206 (e.g., 01:02:04). The method 400 may then operate substantially similarly as discussed above at blocks 408, 410, and 412, and prior to delivery to the endpoint IHS 204, the FCoE frame from the endpoint IHS 206 will have its SMAC address replaced with the local FCF-MAC address as discussed above as well.

If, at decision block 408, it is determined that the destination endpoint IHS is not connected to an edge port on the edge switch IHS, the method 400 proceeds to block 414 where the FCoE frame is forwarded through the network.

For example, the destination endpoint IHS may be the endpoint IHS 212, and the address replacement engine 202a may forward the FCoE frame out of the port 202c to the conventional switch IHS(s) 208. The conventional switch IHS(s) 208 will receive the FCoE frame and forward it through the port 210c to the address replacement engine 210a in the edge switch IHS 210, which will operate to process the FCoE frame substantially as described above with regard to block 410 and 412 (i.e., replace the SMAC address of the FCoE frame with the local FCF-MAC address of the edge switch IHS 210) such that the FCoE frame is provided to the endpoint IHS 212. As such, there may be several interim hops between the conventional switch IHS(s) 208 before the FCoE frame reaches the edge switch IHS 210.

Thus, systems and methods have been described that provide an FCoE switch system that allows FCoE communications using FCoE frames that are rewritten at the edge switch IHSs on both ingress and egress to allow for transparent operation of the endpoint IHSs as well as the L2 Ethernet network. The systems and methods provide for direct communication and routing of FCoE frames between a source endpoint IHS and a destination endpoint IHS that are each connected to the same edge switch IHS without the need to route that FCoE frame to an FCF, thus eliminating the unnecessary L2 Ethernet hops and FCF FC_ID lookup hop that is required in conventional FC switch systems that operate according to the FC-BB-5 standard. Once of skill in the art will recognize that the systems and methods described herein allow for the emulation of FC-BB-6 standard style direct VN_Port-to-VN_Port communication using FC-BB-5 compliant endpoints without any modifications to the code on those endpoints.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A Fibre Channel over Ethernet (FCoE) switch system, comprising:
a processing system;
a memory system that includes instructions that, when executed by the processing system, cause the processing system to provide an address replacement engine that is configured to:
receive a first FCoE communication from a first endpoint device through a first edge port, wherein the first FCoE communication includes an Fibre Channel (FC) header, a source MAC address of the first endpoint device, a destination media access control (MAC) address of the address replacement engine, and a destination identifier of a second endpoint device;
create a derived MAC address using the destination identifier of the second endpoint device;
replace the destination MAC address in the first FCoE communication with the derived MAC address;
determine whether the second endpoint device is connected to a second edge port;
in response to the second endpoint device being connected to the second edge port, replace the source MAC address in the first FCoE communication with a local Fibre Channel Forwarder (FCF) MAC address; and
forward the first FCoE communication to the second endpoint device through the second edge port.

2. The system of claim 1, further comprising:
determine that the second endpoint device is connected through a network and, in response, forward the first FCoE communication to the second endpoint device through the network.

3. The system of claim 1, wherein the address replacement engine is further configured to:
receive a second FCoE communication from a third endpoint device through a network, wherein the second FCoE communication includes a source MAC address;
replace the source MAC address of the second FCoE communication with a local Fibre Channel Forwarder (FCF) MAC address; and
forward the second FCoE communication to the first endpoint device through the first edge port.

4. The system of claim 1, wherein the first endpoint device and the second endpoint device are each compliant with the Fibre Channel Backbone-5 (FC-BB-5) standard.

5. The system of claim 1, wherein the derived MAC address includes an FC-MAP prepended to a destination identification (D_ID) included in the FC header.

6. The system of claim 1, the address replacement engine is further configured to:
establish a control plane with the first endpoint device.

7. An information handling system (IHS) network, comprising:
a first endpoint IHS;
a second endpoint IHS;
a switch IHS directly connected to each of the first endpoint IHS and the second endpoint IHS, wherein the switch IHS is configured to:
receive a first FCoE communication from the first endpoint IHS through a first edge port, wherein the first FCoE communication includes a first Fibre Channel (FC) header, a first source media access control (MAC) address of the first endpoint IHS, a first destination MAC address of the switch IHS, and a destination identifier of the second endpoint IHS;
create a first derived MAC address using the destination identifier of the second endpoint IHS;
replace the first destination MAC address in the first FCoE communication with the first derived MAC address;
determine whether the second endpoint IHS is connected to a second edge port;
in response to the second endpoint IHS being connected to the second edge port, replace the first source MAC address in the first FCoE communication with a local Fibre Channel Forwarder (FCF) MAC address; and
forward the first FCoE communication to the second endpoint IHS through the second edge port.

8. The IHS of claim 7, further comprising:
a third endpoint IHS coupled to the switch IHS through a network, wherein the switch IHS is further configured to:
receive a second FCoE communication from the first endpoint IHS, wherein the second FCoE communication includes a second Fibre Channel (FC) header, a second destination media access control (MAC) address, and a destination identifier of the third endpoint IHS;

create a second derived MAC address using the destination identifier of the third endpoint IHS;
replace the second destination MAC address in the second FCoE communication with the second derived MAC address; and
forward the second FCoE communication to the third endpoint IHS.

9. The IHS of claim 7, further comprising:
a third endpoint IHS coupled to the switch IHS through a network, wherein the switch IHS is further configured to:
receive a second FCoE communication from the third endpoint IHS through the network, wherein the second FCoE communication includes a second source MAC address;
replace the second source MAC address of the second FCoE communication with the local Fibre Channel Forwarder (FCF) MAC address; and
forward the second FCoE communication to the first endpoint IHS through the first edge port.

10. The IHS of claim 7, wherein the first endpoint IHS and the second endpoint IHS are each compliant with the Fibre Channel Backbone-5 (FC-BB-5) standard.

11. The IHS of claim 7, wherein the first derived MAC address includes an FC-MAP prepended to a destination identification (D_ID) included in the first FC header.

12. The IHS of claim 7, wherein the switch IHS is further configured to:
establish a control plane with the first endpoint IHS.

13. A method for transmitting Fibre Channel (FC) data traffic, comprising:
receiving, by a switch IHS, a first FCoE communication from a first endpoint IHS through a first edge port on the switch IHS, wherein the first FCoE communication includes an Fibre Channel (FC) header, a source MAC address of the first endpoint IHS, destination media access control (MAC) address of the switch IHS, and a destination identifier of a second endpoint IHS;
creating, by the switch IHS, a derived MAC address using the destination identifier of the second endpoint IHS included in the FC header;
replacing, by the switch IHS, the destination MAC address in the first FCoE communication with the derived MAC address; and
determine whether the second endpoint IHS is connected to a second edge port on the switch IHS;
in response to the second endpoint IHS being connected to the second edge port, replace the source MAC address in the first FCoE communication with a local Fibre Channel Forwarder (FCF) MAC address; and
forwarding, by the switch IHS, the first FCoE communication to a second endpoint IHS through the second edge port.

14. The method of claim 13, further comprising:
determining, by the switch IHS, that the second endpoint IHS is connected through a network and, in response, forwarding the first FCoE communication to the second endpoint IHS through the network.

15. The method of claim 13, further comprising:
receiving, by the switch IHS, a second FCoE communication from a third endpoint device through a network, wherein the second FCoE communication includes a source MAC address;
replacing, by the switch IHS, the source MAC address of the second FCoE communication with a local Fibre Channel Forwarder (FCF) MAC address; and
forwarding, by the switch IHS, the second FCoE communication to the first endpoint IHS through the first edge port.

16. The method of claim 13, wherein the first endpoint IHS and the second endpoint IHS are each compliant with the Fibre Channel Backbone-5 (FC-BB-5) standard.

17. The method of claim 13, wherein the first derived MAC address includes an FC-MAP prepended to a destination identification (D_ID) included in the first FC header.

18. The method of claim 13, further comprising:
establishing, by the switch IHS, a control plane with the first endpoint IHS.

* * * * *